(12) United States Patent
Wierzba et al.

(10) Patent No.: US 8,215,441 B2
(45) Date of Patent: *Jul. 10, 2012

(54) STEERING SYSTEM FOR CRANE

(75) Inventors: Jerry J. Wierzba, Sturgeon Bay, WI (US); Timothy J. Minkin, Sturgeon Bay, WI (US)

(73) Assignee: Marine Travelift, Inc., Sturgeon Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/853,233

(22) Filed: Aug. 9, 2010

(65) Prior Publication Data

US 2011/0108347 A1    May 12, 2011

Related U.S. Application Data

(63) Continuation of application No. 12/423,130, filed on Apr. 14, 2009, now Pat. No. 7,798,274, and a continuation of application No. 11/684,330, filed on Mar. 9, 2007, now Pat. No. 7,520,362, which is a continuation of application No. 11/058,738, filed on Feb. 15, 2005, now Pat. No. 7,252,299.

(51) Int. Cl.
*B60K 17/30* (2006.01)

(52) U.S. Cl. ......... 180/253; 180/411; 180/242; 180/308

(58) Field of Classification Search .................. None
See application file for complete search history.

(56) References Cited

U.S. PATENT DOCUMENTS

| | | | |
|---|---|---|---|
| 3,645,406 A | 2/1972 | Brazell | |
| 3,696,881 A * | 10/1972 | Gordon | 180/411 |
| 3,792,779 A | 2/1974 | Brazell | |
| 3,933,215 A | 1/1976 | Scheuerle | |
| 3,933,218 A | 1/1976 | Oler et al. | |
| 4,200,162 A | 4/1980 | Tax | |
| 4,219,094 A | 8/1980 | Sturgill | |
| 4,229,649 A * | 10/1980 | Hawkins et al. | 250/215 |
| 4,263,979 A | 4/1981 | Sturgill | |
| 4,284,159 A | 8/1981 | Voelz | |
| 4,378,072 A | 3/1983 | Appleman et al. | |
| 4,444,287 A | 4/1984 | Voelz | |
| 4,457,389 A | 7/1984 | Voelz | |
| 4,531,604 A | 7/1985 | Lamer | |
| 4,599,030 A * | 7/1986 | Skaalen et al. | 414/460 |
| 4,664,270 A | 5/1987 | Voelz | |
| 4,667,834 A | 5/1987 | Lanigan et al. | |
| 4,823,899 A * | 4/1989 | Ron | 180/411 |
| 4,880,124 A | 11/1989 | Feider et al. | |
| 4,927,034 A | 5/1990 | Holden | |
| 5,180,070 A | 1/1993 | Feider | |
| 5,699,873 A | 12/1997 | Moriya | |

(Continued)

*Primary Examiner* — Joanne Silbermann
*Assistant Examiner* — Marlon Arce
(74) *Attorney, Agent, or Firm* — Banner & Witcoff, Ltd.

(57) ABSTRACT

A steering system (10) for a vehicle, such as a gantry crane (12). The gantry crane (12) generally includes a support structure (14) having a first front wheel (32) and a second opposing front wheel (36) connected proximate a front portion of the crane (12), and a first rear wheel (30) and a second opposing rear wheel (34) connected proximate a rear portion of the crane (12). A control system connected to the crane includes a user interface (111) electronically coupled to a command potentiometer (114) and a programmable controller responsive to the command potentiometer for controlling the angular position of each of the first front wheel (32), the second front wheel (36), the first rear wheel (30) and the second rear wheel (34) to effect a steering mode selected through the user interface (111).

27 Claims, 12 Drawing Sheets

U.S. PATENT DOCUMENTS

| | | |
|---|---|---|
| 5,752,578 A | 5/1998 | Kellogg |
| 6,109,379 A | 8/2000 | Madwed |
| 6,163,116 A | 12/2000 | Tanquary et al. |
| 6,193,086 B1 | 2/2001 | Gunnlaugsson et al. |
| 6,206,127 B1 | 3/2001 | Zakula, Sr. et al. |
| 6,283,220 B1 | 9/2001 | Carter |
| 6,827,176 B2 | 12/2004 | Bean |
| 6,968,963 B1 | 11/2005 | Zakula, Sr. et al. |
| 7,137,470 B2 * | 11/2006 | Gotz .............................. 180/264 |
| 7,255,194 B2 | 8/2007 | Lim et al. |
| 2005/0061570 A1 * | 3/2005 | McVicar et al. .............. 180/308 |
| 2005/0287010 A1 | 12/2005 | Below |

* cited by examiner

STEERING SYSTEM FOR CRANE

CROSS-REFERENCE TO RELATED APPLICATIONS

This application is a continuation application of and claims the benefit of U.S. application Ser. No. 12/423,130, filed Apr. 14, 2009, which is a continuation of U.S. application Ser. No. 11/684,330, filed Mar. 9, 2007, now U.S. Pat. No. 7,520,362, issued Apr. 21, 2009, which is a continuation of U.S. application Ser. No. 11/058,738, filed Feb. 15, 2005, now U.S. Pat. No. 7,252,299, issued Aug. 7, 2007, which applications are incorporated by reference herein and made a part hereof.

FEDERALLY SPONSORED RESEARCH OR DEVELOPMENT

None.

TECHNICAL FIELD

The invention relates to steering systems for cranes and, more particularly, to a four-wheel steering system for a gantry crane.

BACKGROUND OF THE INVENTION

Steering systems for industrial cranes such as gantry cranes are well known in the art. Gantry cranes are used for lifting and transporting large cargo containers to and from railroad cars, truck trailers and other locations as well as for lifting and transporting boats. An operator utilizes the steering system to navigate the gantry crane through rail yards, warehouses, boat yards or other locations. While the steering systems according to the prior art provide a number of advantageous features, they nevertheless have certain limitations.

The present invention is provided to overcome certain of these limitations and other drawbacks of the prior art, and to provide advantages and aspects not provided by prior steering systems. A full discussion of the features and advantages of the present invention is deferred to the following detailed description, which proceeds with reference to the accompanying drawings.

SUMMARY OF THE INVENTION

The present invention provides a steering system for a crane. In one preferred embodiment, the steering system is used on a gantry crane.

According to one aspect of the invention, a steering system for a crane is provided. The steering system comprises a first front wheel and a second opposing front wheel connected proximate a front portion of the crane, a first rear wheel and a second opposing rear wheel connected proximate a rear portion of the crane; and a control system connected to the crane. The control system includes a command potentiometer, a user interface electronically coupled to the command potentiometer, and a programmable controller responsive to the command potentiometer for controlling the angular position of each of the first front wheel, the second front wheel, the first rear wheel and the second rear wheel to effect a steering mode selected through the user interface.

The steering system is configured to implement a number of safety features. The crane includes an engine for driving the wheels connected to the crane which is capable of operation at a variety of different RPMs. In one embodiment, the control system includes a sensor coupled to the engine and the controller for providing the controller with an operating RPM of the engine. The controller is configured so that if the operating RPM is lower than a predetermined amount, the controller adjusts the rate of change of the angular position of each wheel. The controller slows down the rate of turning of each wheel to coincide with the sensed engine RPM.

The control system includes a first sensor for monitoring the angular position of the first front wheel, a second sensor for monitoring the angular position of the second front wheel, a third sensor for monitoring the angular position of the first rear wheel, and a fourth sensor for monitoring the angular position of the second rear wheel. The first, second, third and fourth sensors are coupled to the controller wherein the controller monitors the angular positions of the wheels. According to another safety feature, when one of the wheels exceeds a predetermined distance between its sensed position and programmed position (this can happen if a wheel is in a rut), the controller stops angular movement of the remaining wheels until the out of position wheel is at its programmed position.

The controller is also programmed to slow down movement of the crane before effecting a carousel steering mode selected through the user interface. To position the wheels of the crane into the proper steering position for the carousel mode as efficiently as possible, the controller is programmed to move the angular position of each wheel one of clockwise and counter clockwise, to effect the smallest amount of angular movement necessary.

The user interface can comprise a proportional device that provides a direction and a magnitude signal. For example, the proportional can be a joystick.

According to another embodiment of the invention, a steering system for controlling the steering mode of a crane comprises a crane structure having a first front wheel proximate a front portion of a first side of the crane structure, a second front wheel proximate a front portion of a second side of the crane structure, a first rear wheel proximate a rear portion of the first side, and a second rear wheel proximate a rear portion on the second side. A user interface for selecting a steering mode is either mounted to the crane or coupled to the crane via a remote control. A controller connected to the crane is communicatively coupled to the user interface. The controller is configured to monitor the position of the first and second front wheels and the first and second rear wheels, and to control movement of the first and second front wheels and the first and second rear wheels in response to a selected steering mode. The controller further configured to monitor an operating parameter of the crane, such as engine RPMs.

The controller is further programmed to disable an engine drive of the crane prior to positioning the wheels in a selected steering mode, and to enable the engine drive after the wheels are in position to effect the selected steering mode. In particular, this is done when selecting a carousel steering mode.

The controller senses the position of each wheel when implementing the selected steering mode and the rate each wheel is turning to the desired final position. The controller will disable movement of all wheels upon a determination that at least one wheel is not moving to a desired position at a desired rate. This may indicate the problem wheel is in a rut or has some other malfunction requiring user intervention.

In one form, the user interface is mounted to the crane and communicatively coupled to the controller via a wire. Alternatively, the user interface is mounted to a radio transmitter and is communicatively coupled to the controller via radio frequency transmissions.

The steering system further comprises a command potentiometer coupled to the user interface and the controller. The position of each wheel is responsive to the command potentiometer.

The controller is further configured to monitor the drive engine RPM rate. The controller lowers a rate of turning each wheel to a desired position for the selected steering mode upon sensing a low RPM rate.

The steering system is configured to cause the first front wheel and the second rear wheel to rotate counterclockwise to move into position for a selected carousel steering mode, and to cause the second front wheel and the first rear wheel to rotate clockwise to move into position for the carousel steering mode. The system then reverses the drive direction of the second front wheel and the second rear wheel.

According to yet another embodiment of the invention, a steering system for controlling the steering mode of a large vehicle, such as a gantry crane or other large vehicle is provided. The steering system comprises a vehicle having a drive engine mechanically coupled to a plurality of wheels positioned to effect movement of the vehicle, and a controller connected to the vehicle configured to implement a user selected steering command. The system further includes a plurality of first sensors coupled to the controller. Each first sensor is further coupled to one of the plurality of wheels. A signal from each first sensor to the controller provides an indication of the respective wheel position. Additionally, the system includes a user interface coupled to the controller for providing a user selected steering command, and a plurality of hydraulic motors coupled to the controller. Each motor is also coupled to one of the plurality of wheels of the vehicle to rotate the respective wheel upon receipt of a wheel position command signal from the controller.

The system also includes second sensor (or a plurality of second sensors) coupled to the controller for sensing a parameter (or a number of parameters) of the vehicle. This can enable the system to monitor the parameters and adjust the steering system as needed.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
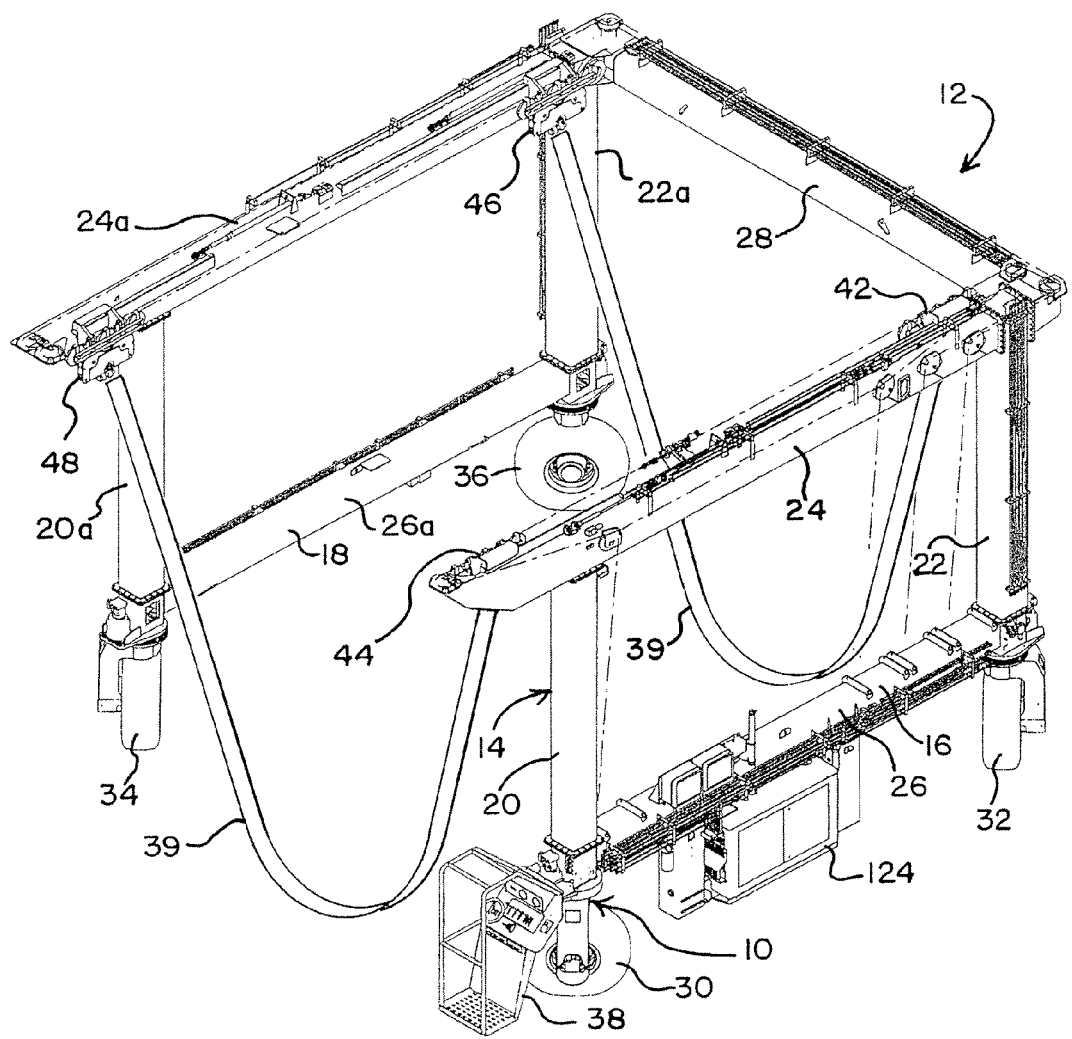
FIG. 1 is a perspective view of a gantry crane with the wheels positioned in a carousel steering mode according to one aspect of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 shows a steering system 10 operably connected to a vehicle, such as gantry crane 12. However, it is understood that the steering system 10 can be connected to other types of cranes. The general structure of the gantry crane 12 will first be described followed by a description of the steering system 10. It is understood the description of the gantry crane 12 component is exemplary and could vary depending on the type of crane or gantry crane utilized.

The gantry crane 12 generally includes a gantry structure 14 having a right side support frame 16 and a left side support frame 18 (reference to the "right" and "left" sides is from the perspective of one viewing the gantry crane 12 as it appears in FIG. 1). The right side support frame 16 and the left side support frame 18 are substantially identical in significant respects.

Referring to FIG. 1, the right side support frame 16 includes a right rear vertical leg 20, a right front vertical leg 22, a right upper side beam 24 and a right lower side beam 26. The upper side beam 24 and the lower side beam 26 span between and connect the right rear vertical leg 20 and the right front vertical leg 22. An upper cross beam 28 extends between and is connected to the right side support frame 16 and the left side support frame 18. A right rear wheel 30 is located near a lower end of the right rear vertical leg 20 and a right front wheel 32 is located near a lower end of the right front vertical leg 22.

Also referring to FIG. 1, the left side support frame 18 also similarly includes a left rear vertical leg 20a, a left front vertical leg 22a, a left upper side beam 24a and a left lower side beam 26a. The upper side beam 24a and the lower side beam 26a span between and connect the right rear vertical leg 20a and the right front vertical leg 22a. A left rear wheel 34 is located near a lower end of the left rear vertical leg 20a and a left front wheel 36 is located near a lower end of the left front vertical leg 22a.

The wheel base of the gantry crane 12 is the distance between the rear wheels 30, 34 and the front wheels 32, 36. The width of the gantry crane 12 is the distance between the right side wheels 30, 32 and the left side wheels 34, 36. The upper cross beam 28 connecting the right side support 16 and the left side support frame 18 can be adjustable. For example, the upper cross beam can include a flanged joint or other structure to allow for adjusting the length of upper cross beam 28, and thus the width of the gantry crane 12.

It is understood that the four wheels 30, 32, 34, 36 allow for a mobile gantry structure 14. As explained in greater detail below, the steering system 10 monitors and controls the position (i.e., angle) of the wheels 30, 32, 34, 36 to control the direction of movement of the gantry crane 12. An operator cab 38 is shown attached to the right side support frame 16 at the right rear vertical leg 20*a*. It is understood that the operator cab 38 can take other forms and be positioned at different locations. The operator cab 38 could also be mounted for vertical and/or horizontal movement between various locations.

As further shown in FIG. 1, the gantry crane 12 has a lifting assembly operably attached to the gantry structure 14. The lifting assembly includes a right front load block 42 and a right rear load block 44 operably connected to the right side support frame 16. A left front load block 46 and a left rear load block 48 are similarly attached to the left side support frame 18. Attached to and suspended from the four load blocks 42, 44, 46, 48 are sling assemblies 39 used to lift objects such as, for example, large boats or other loads. It is understood that the sling assemblies 39 could also be replaced by a spreader attachment that is specifically designed to lift truck trailers or large cargo containers. The load blocks 42, 44, 46, 48 operate collectively to raise and lower the sling assemblies 39.

Each wheel 30, 32, 34, 36 has a hydraulic assembly 100 connected thereto. The hydraulic assembly 100 is also operably connected to the steering system 10. As graphically illustrated in FIG. 8, each hydraulic assembly 100 includes a hydraulic motor 102 with a pinion drive gear 104. As explained in greater detail below, each hydraulic assembly 100 receives control or turn signals from the steering system 10 and operates accordingly to rotate the respective wheel to a desired (i.e., programmed) position. Other systems can also be used for turning the wheels. For example, a hydraulic cylinder system with appropriate linkages can be used in place of the hydraulic motor 102 and pinion drive gear 104. Such hydraulic cylinder systems used in steering systems are known in the art.

The steering system 10 is uniquely configured and programmed to monitor and control the position of the wheels 30, 32, 34, 36 as well as various operating parameters of the gantry crane 12 for steering the crane. In addition to the wheels 30, 32, 34, 36, the steering system 10 generally includes the following components: a controller 110; hydraulic components (including the hydraulic assembly 100) controlled by the controller 110 for turning the wheels 30, 32, 34, 36, a user or operator interface 111, and a motorized master control potentiometer 114. The controller 110 is uniquely programmed to accommodate the various steering modes and safety functions described herein.

Preferably, the steering system 10 utilizes an IQAN based steering control system (which is manufactured by Parker). An IQAN system is particularly applicable for electronically controlling and monitoring hydraulics in mobile machines, such as a mobile gantry crane. Additionally, the IQAN system can be configured to communicate with other systems or components in the gantry crane 12. The IQAN system can be programmed by a user of the system via a high level graphical design tool.

Figure 10:
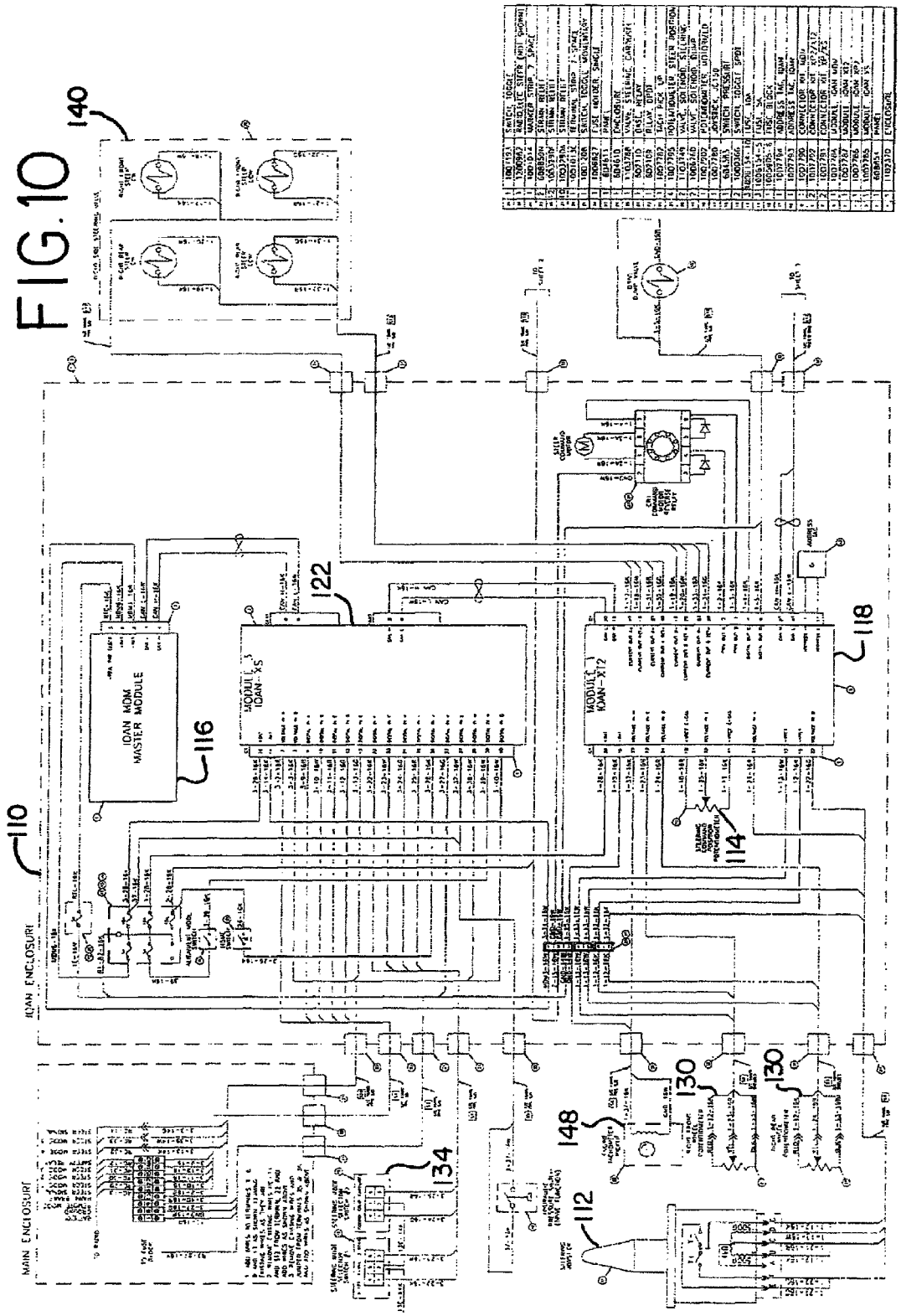
FIG. 10 is a portion of a schematic diagram of an electrical control circuit for the steering control system of a gantry crane in accordance with an embodiment of the present invention.
Figure 11:
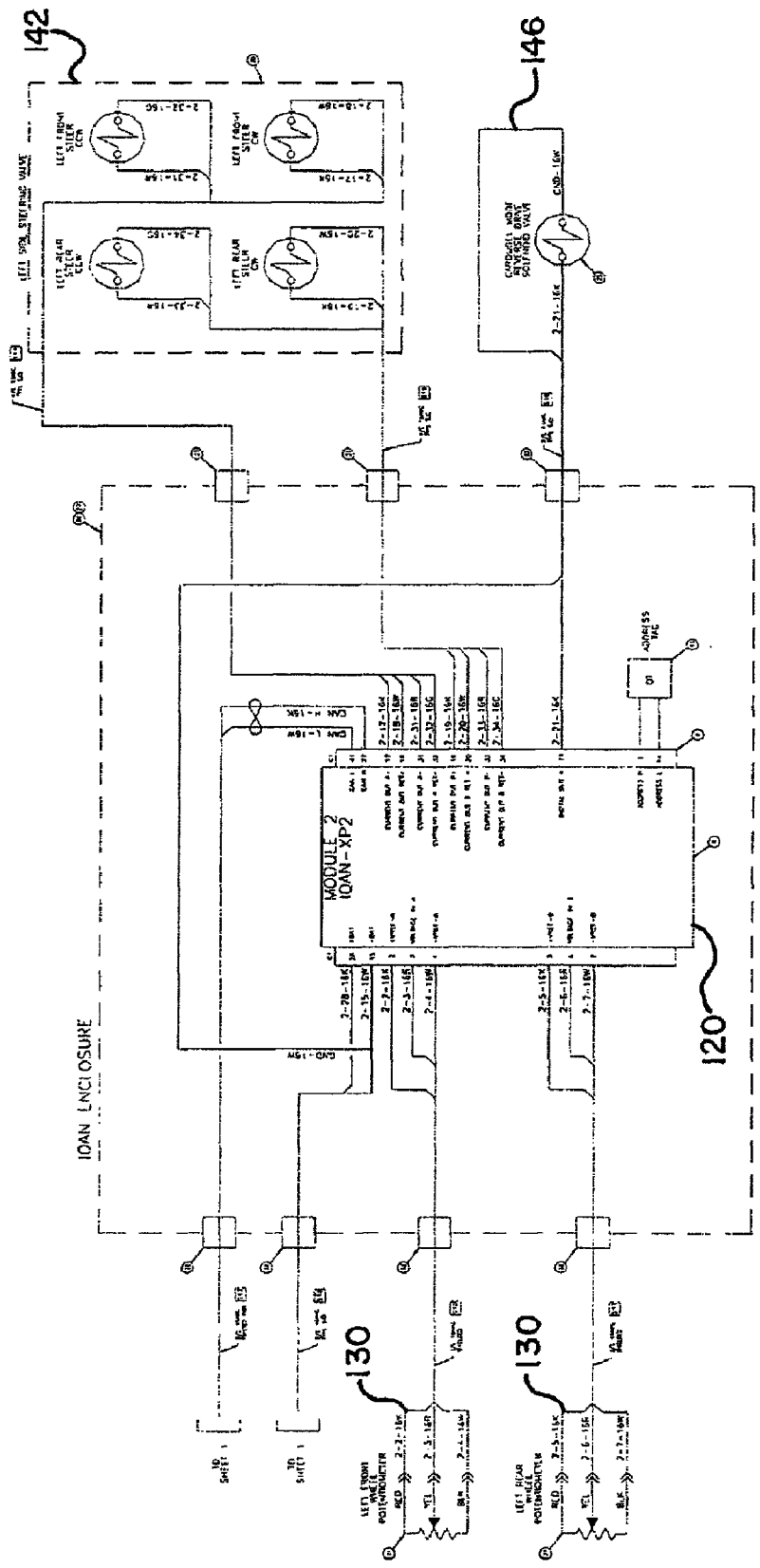
FIG. 11 is another portion of the schematic diagram of FIG. 10.

The IQAN system can comprise one or more IQAN modules. Preferably, one of the modules is a master module 116 having a display unit. The master IQAN module 116 is responsible for implementing the programmed steering modes of the gantry crane 12. As illustrated in FIGS. 10 and 11, the master module 116 is electronically connected to a first additional IQAN module 118 (e.g., an IQAN-XT2), a second additional IQAN module 120 (e.g., an IQAN-XP2), and a third additional IQAN module 122 (e.g., an IQAN XS) which assist in controlling the steering functions of the crane 12 under the control of the master module 116. Collectively, the IQAN modules function as the controller 110. The program can be set to allow an operator to interface with the program through the controller 110.

Steering of the gantry crane 12 is controlled by a master command value provided by an operator of the gantry crane 12. The user or operator interface 111 for providing the master command can be in a variety of forms, such as switches, a paddle or a steering wheel. Moreover, the master command can be implemented mechanically or through the software. One preferred operator interface is a proportional device that commands a direction and a magnitude (i.e., the magnitude reflects the speed that the steering direction is changed) such as a joystick 112. The proportional device controls as DC motor which is connected by a drive shaft to the motorized master control potentiometer 114. Operator movement of the interface 111 activates the motorized master control potentiometer 114 to implement the desired steering functions. The position of each of the wheels 30, 32, 34, 36 is compared to the master potentiometer by the controller 110. The DC motor is adjustable depending on the engine RPMs.

The operator interface 111 is preferably housed in the operator cab 38. The IQAN modules 116, 118, 120, 122 can also be housed in the operator cab 38, or more preferably, in a separate cabinet 124 connected to the gantry crane frame 14. In the embodiment shown in FIG. 1, the cabinet 124 is connected to the right lower side beam 26. The display unit can be placed in the operator cab 38 via an electrical connection.

The IQAN controller 110 is also capable of interfacing with existing radio remote transmitter and receiver technology. Accordingly, the steering system 10 can also be operated by a radio remote transmitter or other remote control device (not shown).

The program run by the controller 110 controls the steering modes of the system 10 in response to input from an operator through the user interface 111. The various steering modes include: two wheel front steer; two wheel rear steer; four wheel carousel steer; four wheel crab (or traverse) steer, and four wheel coordinated steer. Other steering modes can also be programmed into the controller 110 as desired. The different steering modes can be selected from the machine control panel (i.e., the user interface 111) or from the radio remote transmitter.

Each wheel 30, 32, 34, 36 is controlled independently. Preferably, the controller 110 will attempt to rotate the angle of each wheel (about a longitudinal axis 150—see e.g., FIG. 4) at a rate so that all the wheels will reach the desired position for a newly selected steering mode at the same time.

Figure 12:
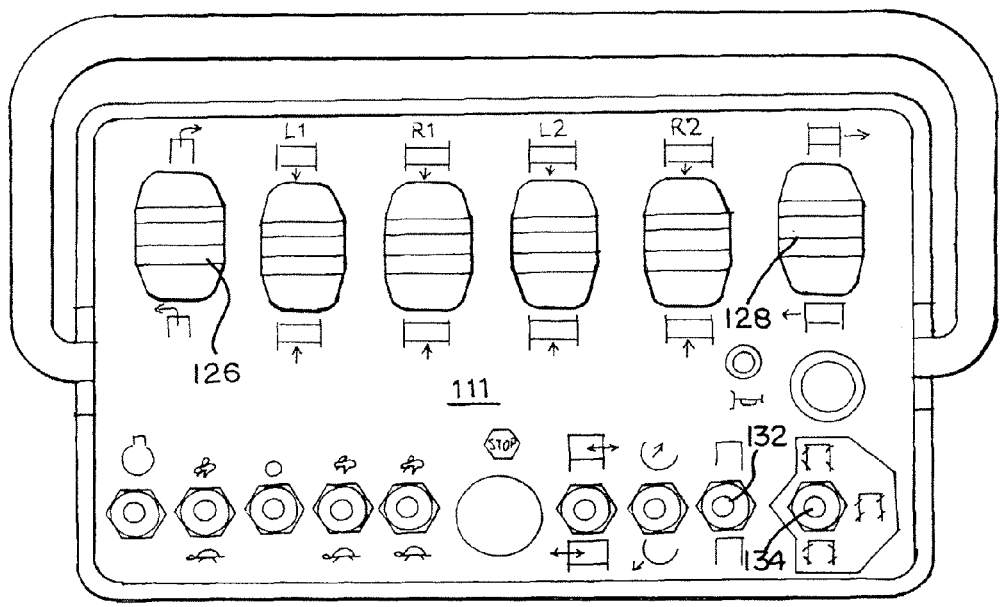
FIG. 12 is a perspective view of the "steer right" and "steer left" controls for use with an embodiment of the steering control system; and, FIG. 13 is a perspective view of controls for controlling selection of the steering mode of the steering control system.

One embodiment of the user interface 111, in the form of a control panel with a plurality of control switches, is shown in FIG. 12. Primary control of the steering is done through a "steer left," or "steer right" command implemented by the operator through a steer left/steer right control switch 126 on the interface 111. In the absence of a steer right or steer left command, the system will implement a "straight ahead" command as a default (assuming the crane is in one of the steering modes applicable). The steer left/steer right control switch 126 may return to a neutral position after implementation of a steering command (this will also occur with the use of a proportional device, like a joystick). However, the steering system is programmed to maintain the steering direction until the operator commands the steering back to "straight ahead" or another direction. The "straight ahead" (or "home") command will return the wheels 30, 32, 34, 36 of the gantry crane 12 to the straight ahead or home positions at a predetermined or commanded rate. The actual straight ahead or home positions are programmed into the control system and can be adjusted mechanically on the machine or via the software. For purposes of this application, movement in the direction from the operator cab 38 toward the upper cross beam 28 will be referred to as the forward or "straight ahead" direction, with opposite movement being the back or rear direction. A control 128 is used to determine the direction of the crane.

Figure 8:
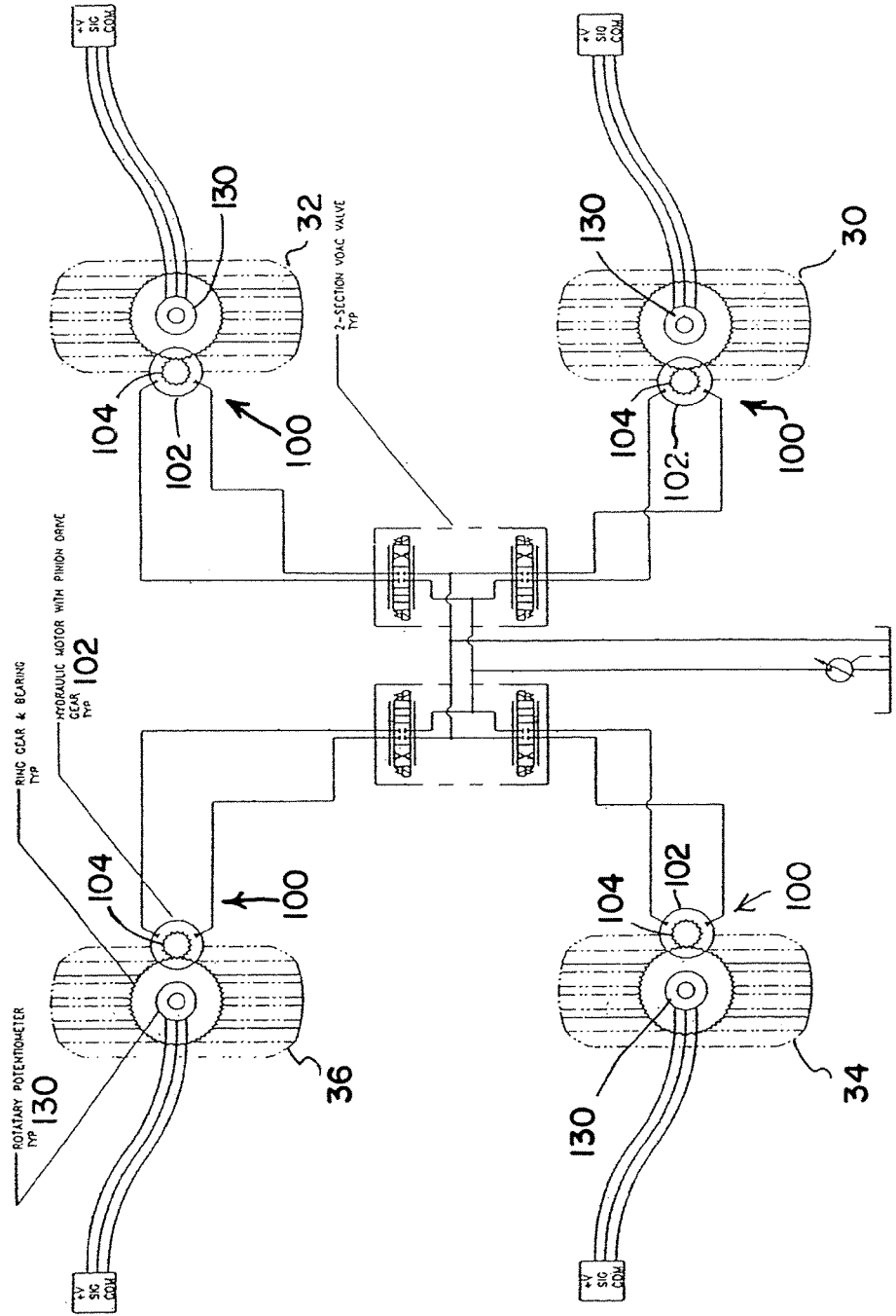
FIG. 8 is a graphical illustration of components for turning and monitoring the position of the wheels of the gantry crane of the present invention.
Figure 9:
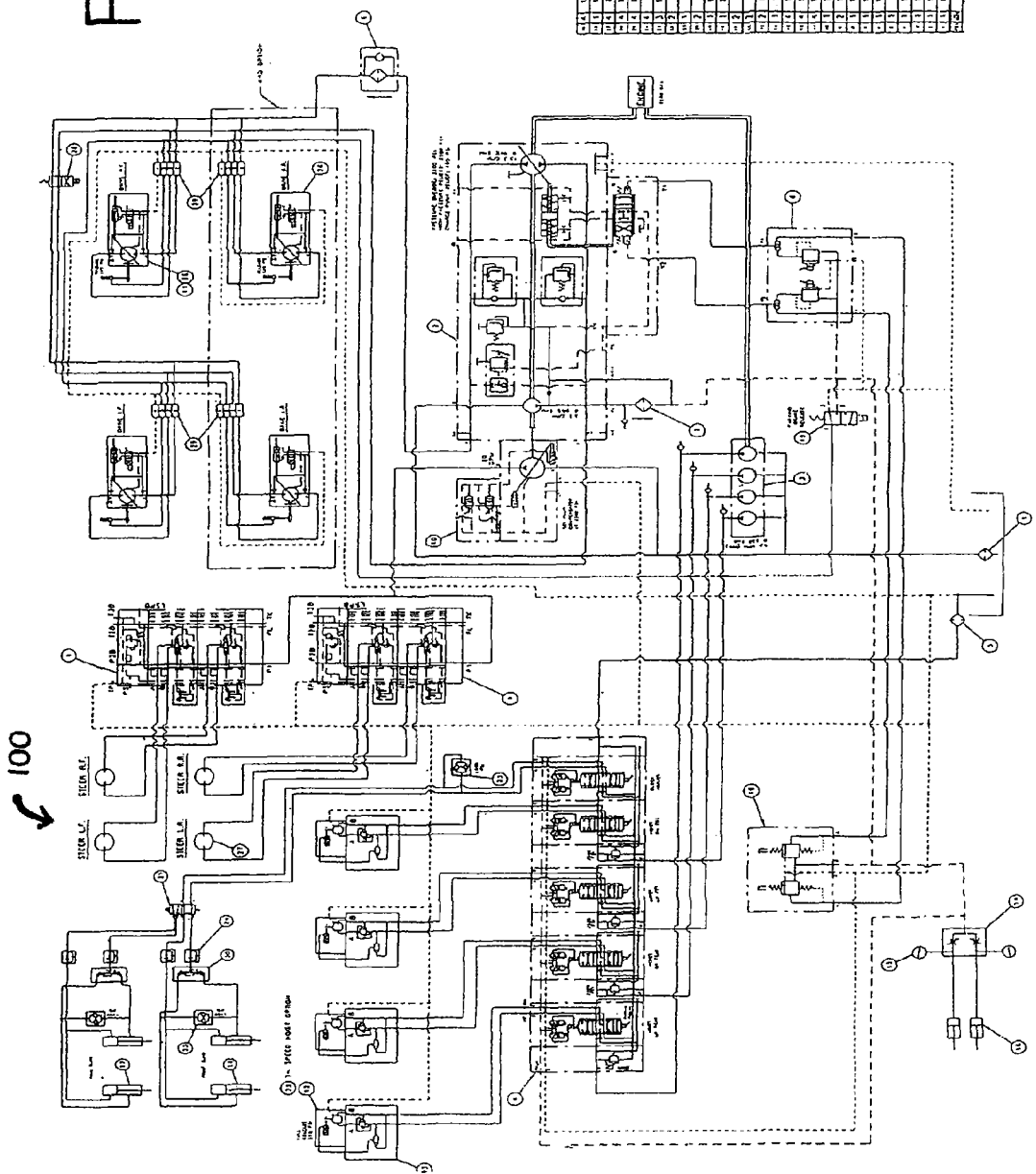
FIG. 9 is a schematic diagram for a hydraulic circuit for controlling the steering components of the gantry crane.

As illustrated in FIG. 8, each wheel 30, 32, 34, 36 of the gantry crane 12 is provided with a positional sensor, such as a rotary potentiometer 130. The rotary potentiometer 130 transmits a signal corresponding to the wheel angle (i.e., the wheel position) to the controller 110. The angle of the wheel is measured with respect to the axis of the upper and lower side beams 24, 26 and 24a, 26a (depending on which side 16 or 18 of the gantry crane 12 the wheel is connected). The controller 110 compares the actual position of the wheel with the desired programmed position for the steering mode selected. In this manner, the controller 110 is able to continuously monitor the position of each wheel 30, 32, 34, 36 and actively control the position by sending the appropriate turn signals to the hydraulic assembly 100 associated with turning each wheel. As discussed in more detail below, the controller 110 can turn each wheel either clockwise or counter clockwise, as necessary, to get the wheel in position for a newly selected steering mode as quickly and efficiently as possible.

The actual movement of the steering wheels 30, 32, 34, 36 can be done independently. That is, no mechanical linkage to the other wheels is necessary. The wheels can be steered with hydraulic cylinders, hydraulic motors, or an electric actuator motor. A gear box may be used to match the steering device to the wheel. Preferably, the gantry crane 12 will use Parker L90 electro-hydraulic proportional valves along with hydraulic motors to move the steering wheels.

Figure 13:
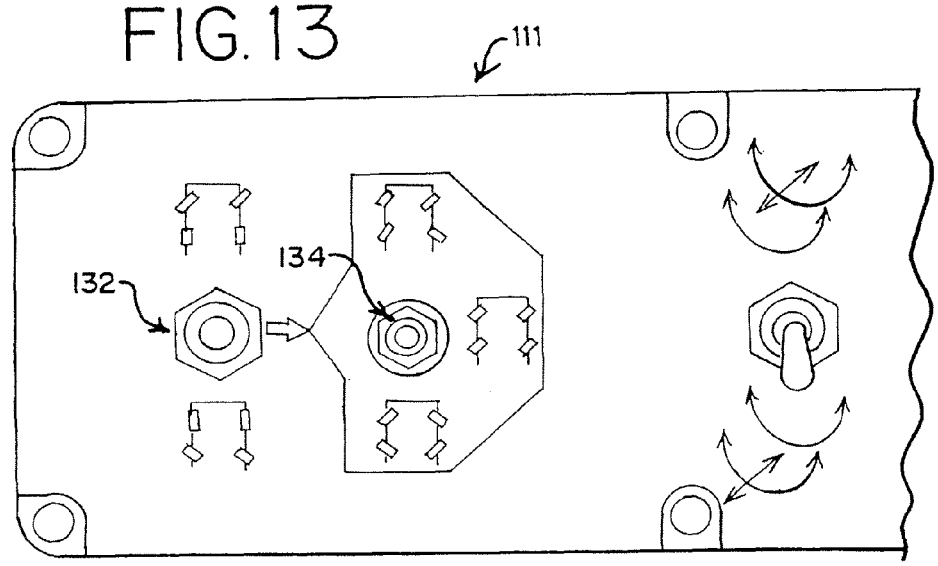

Referring to the embodiments of the user interface 111 in FIGS. 12 and 13, a first steering mode selector switch 132 and a second steering mode selector switch 134 are utilized to allow the user to select the steering mode. The switches 132, 134 can be multi-positional toggle switches as shown in the FIGs. The first steering mode selector switch 132 allows the operator to select either the two-wheel front steering, or the two wheel rear steering modes.

If a four wheel mode is desired, the first steering mode selector switch 132 is moved towards the arrow pointing to the second steering mode selector switch 134. In this position, selection of the steering mode is then determined by the second steering mode selector switch 134. The second steering mode selector switch 134 allows the user to select the four wheel coordinated steering mode, the four wheel carousel steering mode, or the four wheel crab or traverse steering mode. The electrical connections of the switches 132, 134 are illustrated in FIG. 10.

Figure 4:
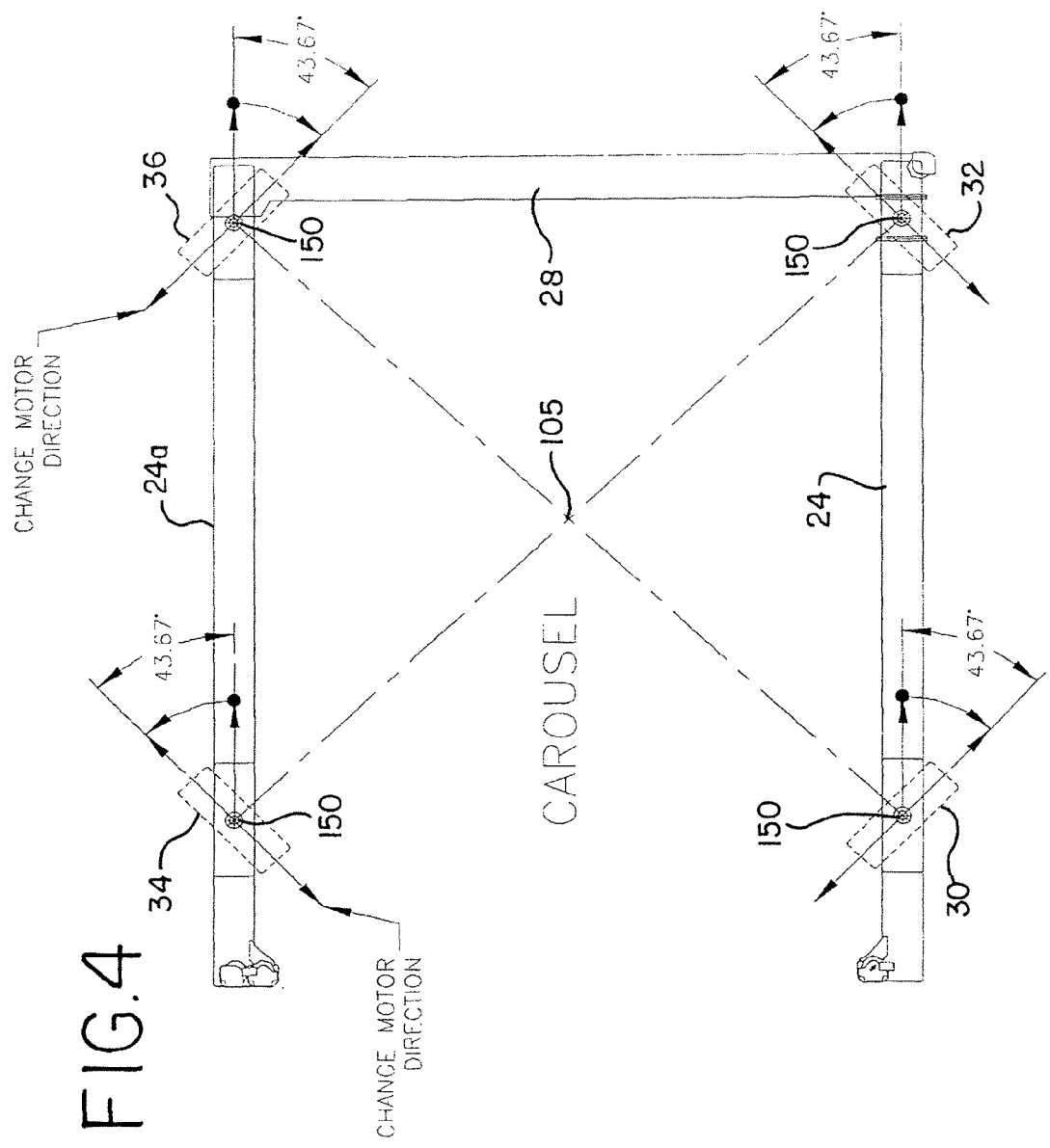
FIG. 4 is a top plan view of a gantry crane in accordance with an aspect of the present invention illustrating positioning of the wheels in the carousel steering mode.

The four wheel carousel steering mode is illustrated in FIGS. 1 and 4. In this mode, the controller 110 sends signals to the hydraulic assemblies 100 for each of the four wheels 30, 32, 34, 36 to position the wheels at an approximately ±43.67 degree angle from the "straight ahead" position generally aligned with the side beams 24, 24a, 26, 26a. This angle may vary depending on the size of the crane (i.e., the wheel base and width distances). Specifically, as shown in FIG. 4, the front right wheel 32 is turned inward (i.e., counterclockwise) 43.67 degrees, and the right rear wheel 30 is turned outward (i.e., clockwise) −43.67 degrees. Similarly, the left front wheel 36 is turned inward (i.e., clockwise) −43.67 degrees, and the left rear wheel 34 is turned outward (i.e., counterclockwise) 43.67 degrees.

The controller 110 turns each respective wheel either clockwise or counterclockwise (about the longitudinal axis 150) to its desired position to minimize the amount of turning required. That is, if the wheels only turned in one direction, for example—counterclockwise, the front left wheel 36 and the right rear wheel 30 would have to travel 316.33 degrees from the straight ahead position to get into the proper carousel mode position (as discussed below, this was done in the past because each wheel could only be rotated about its axle in one direction). The steering control system 10 includes a pressure compensated hydraulic pump that is connected to a right side steering control valve and a left side steering control valve. Each valve has two sections, one for controlling the front wheel and one for the rear wheel of the respective sides. The pump is preferably continuously pressurized (e.g., 3500 psi at idle), so the operator doesn't have to wait for the pressure to build up before the controller 110 can turn the wheels. Instead, the valves will open in the proper direction at the commanded rate upon selection of a steering mode. As illustrated in FIGS. 10 and 11, the system includes a right side steering control valve control 140 and a left side steering control valve control 142. Each control 140, 142 can turn the respective wheels clockwise ("cw") or counterclockwise ("ccw") as desired.

Positioning of the wheels 30, 32, 34, 36 in the carousel mode causes the gantry crane 12 to spin about a central point 104. To accomplish this, the controller changes the direction of movement of the wheels (i.e., about the rotational axis 152 of the wheel—see e.g., FIGS. 1-3) on one of the sides 16, 18 of the crane 12. To travel counterclockwise about the center point 105 of the crane 12 as viewed from above, the driving direction of the left side front and rear wheels 36, 34 is reversed while the right side front and rear wheels 32, 30 remain going forward. Conversely, to travel clockwise about the center point 105, the direction of right side front and rear wheels 32, 30 is reversed, while the left side front and rear wheels 36, 34 remain going forward. As illustrated in FIG. 11, the system controls a reverse drive solenoid valve 146 to implement this feature of the carousel mode.

In operation, once the operator selects the carousel mode, the controller 110 disables the drive engine during transition to correct the position. The wheels are then rotated to the desired positions, and the drive direction of rotation is reversed for two of the wheels. The controller then enables the drive engine.

Figure 2:
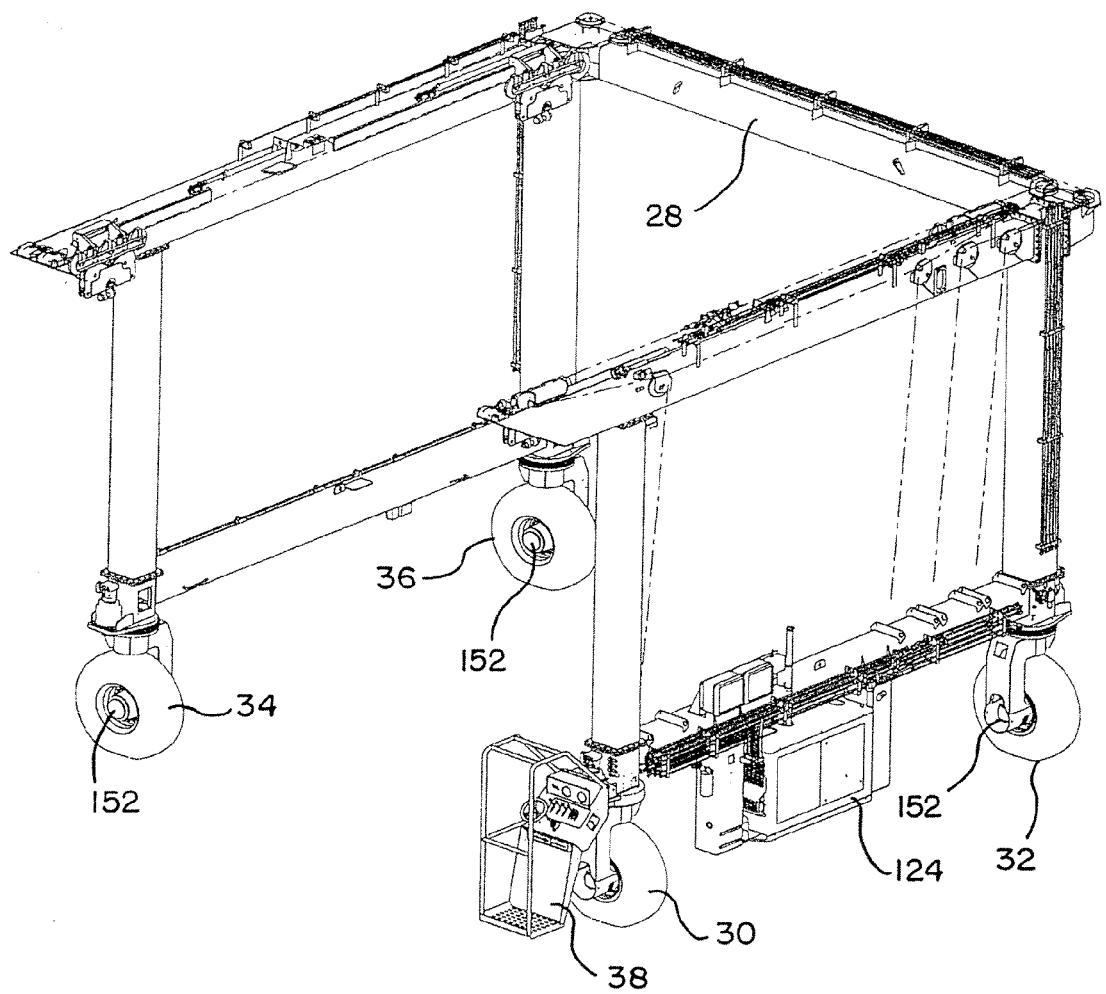
FIG. 2 is a perspective view of the gantry crane of FIG. 1 with the wheels positioned in a crab or traverse steering mode.
Figure 5:
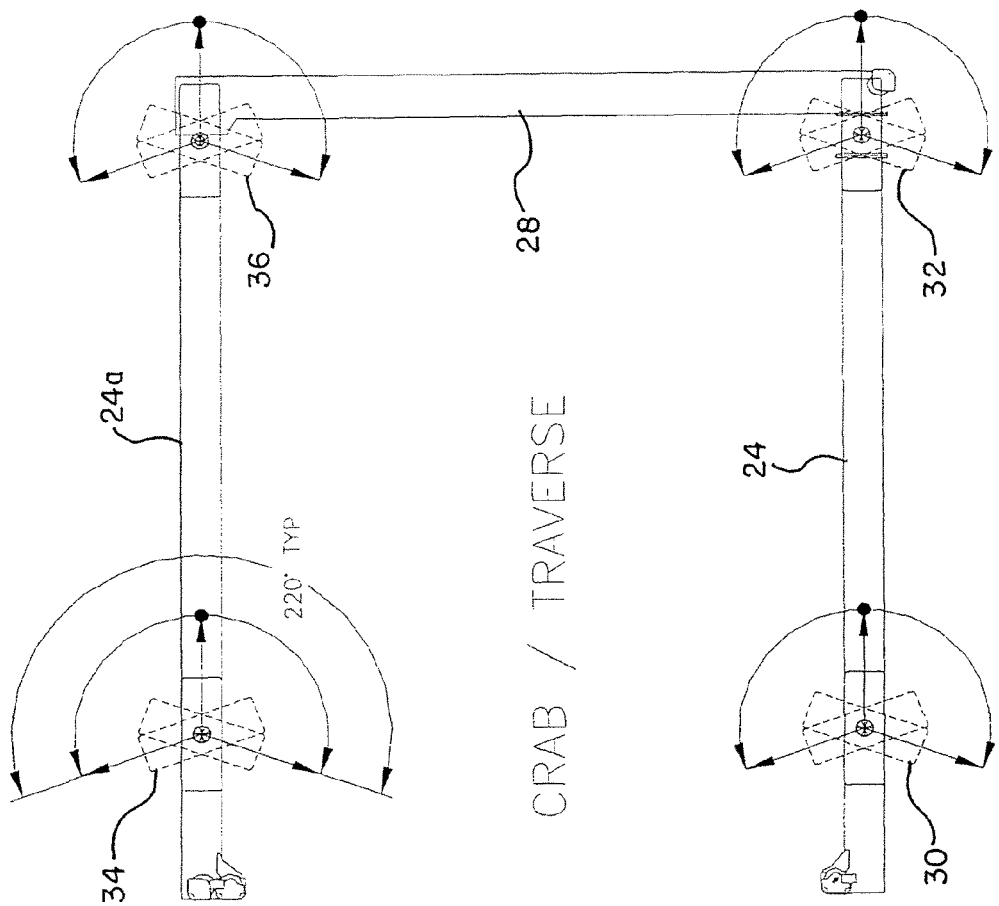
FIG. 5 is a top plan view of the gantry crane of FIG. 4 illustrating positioning of the wheels in the crab or traverse steering mode.

FIG. 2 and FIG. 5 show the gantry crane 12 in the four wheel crab or traverse steering mode. In this mode, the wheels 30, 32, 34, 36 are positioned generally transverse to the forward (i.e., straight ahead) and backward directions of the crane 12 (i.e., approximately ±90 degrees). This allows movement of the gantry crane 12 in the transverse direction (i.e., sideways—similar to movement of a crab). Moreover, the wheels 30, 32, 34, 36 can be adjusted (i.e., turning the wheels slightly away from 90 degrees, for example, by 10 degrees) to steer the gantry crane 12 while in the transverse mode. This provides a component of movement in the forward or backward directions while moving the crane 12 transversely.

Figure 3:
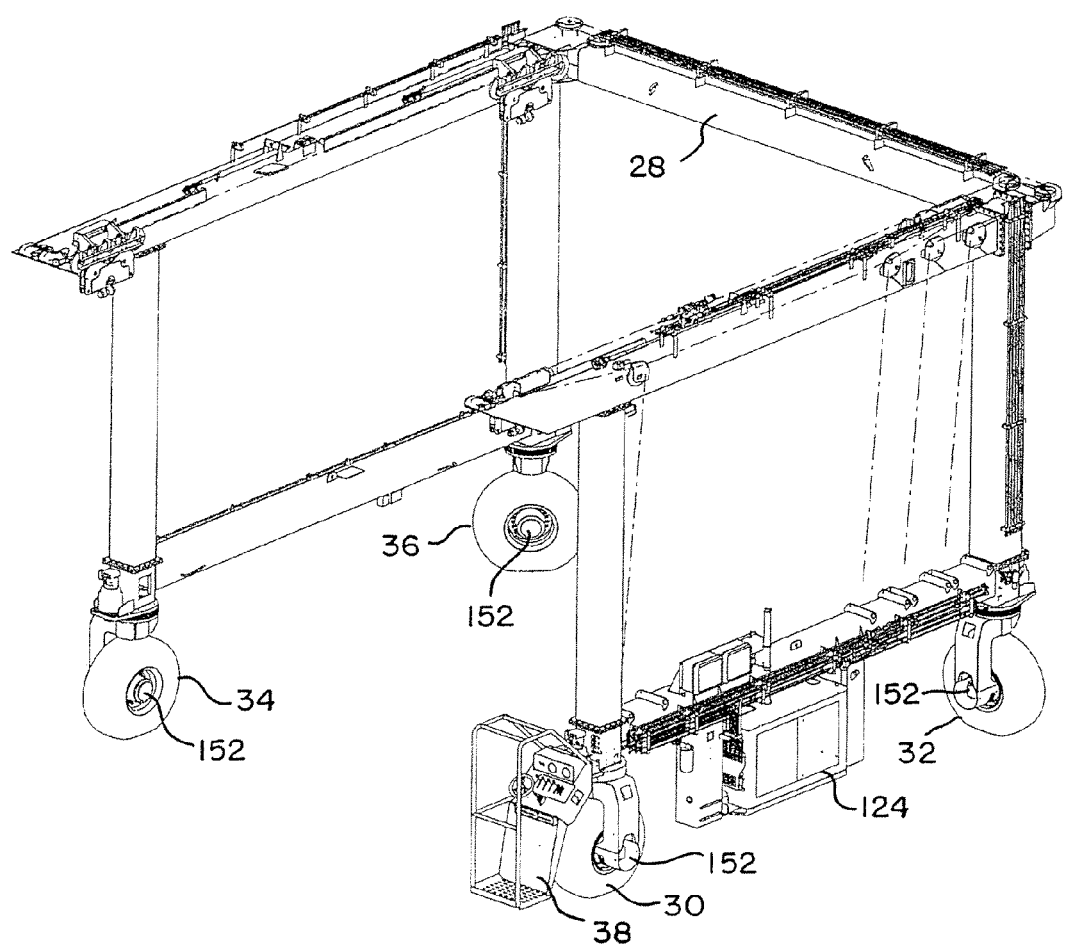
FIG. 3 is a perspective view of the gantry crane of FIG. 1 with the wheels positioned in a two wheel front steering mode.
Figure 6:
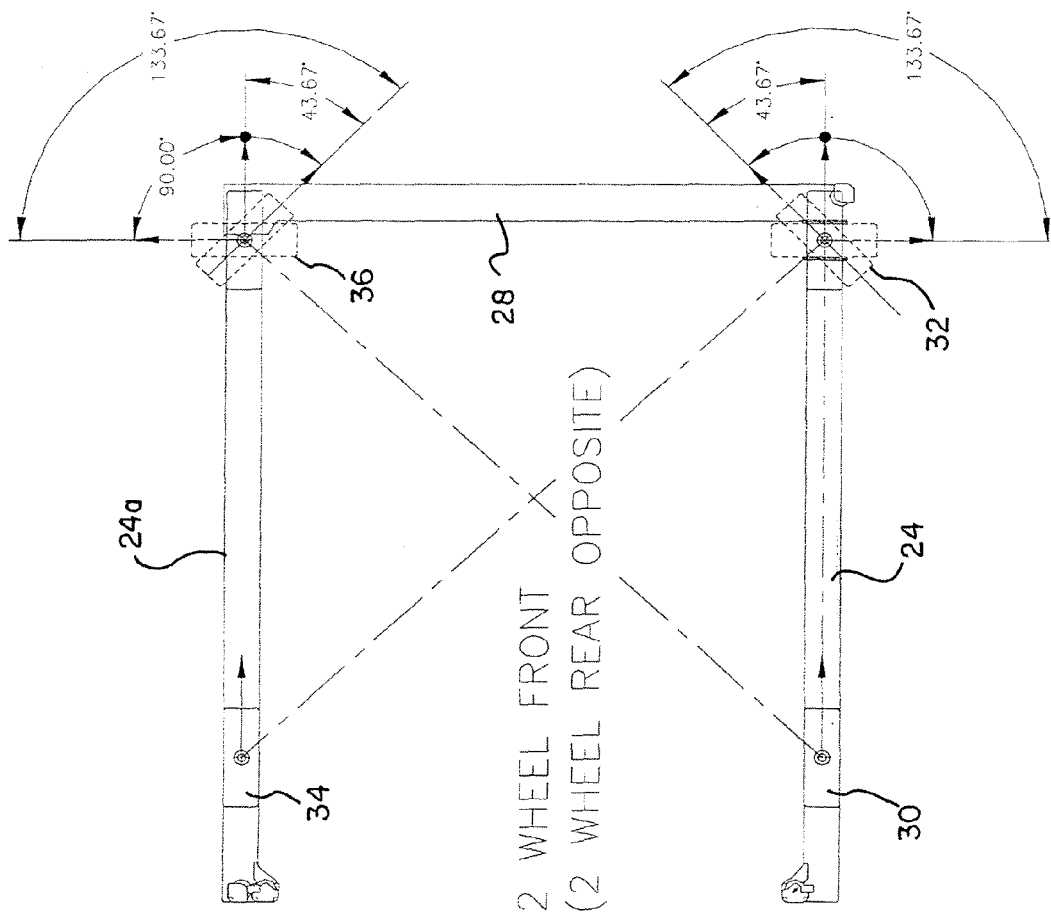
FIG. 6 is a top plan view of the gantry crane of FIG. 4 illustrating positioning of the wheels in the two wheel front (and two wheel rear) steering mode(s)
Figure 7:
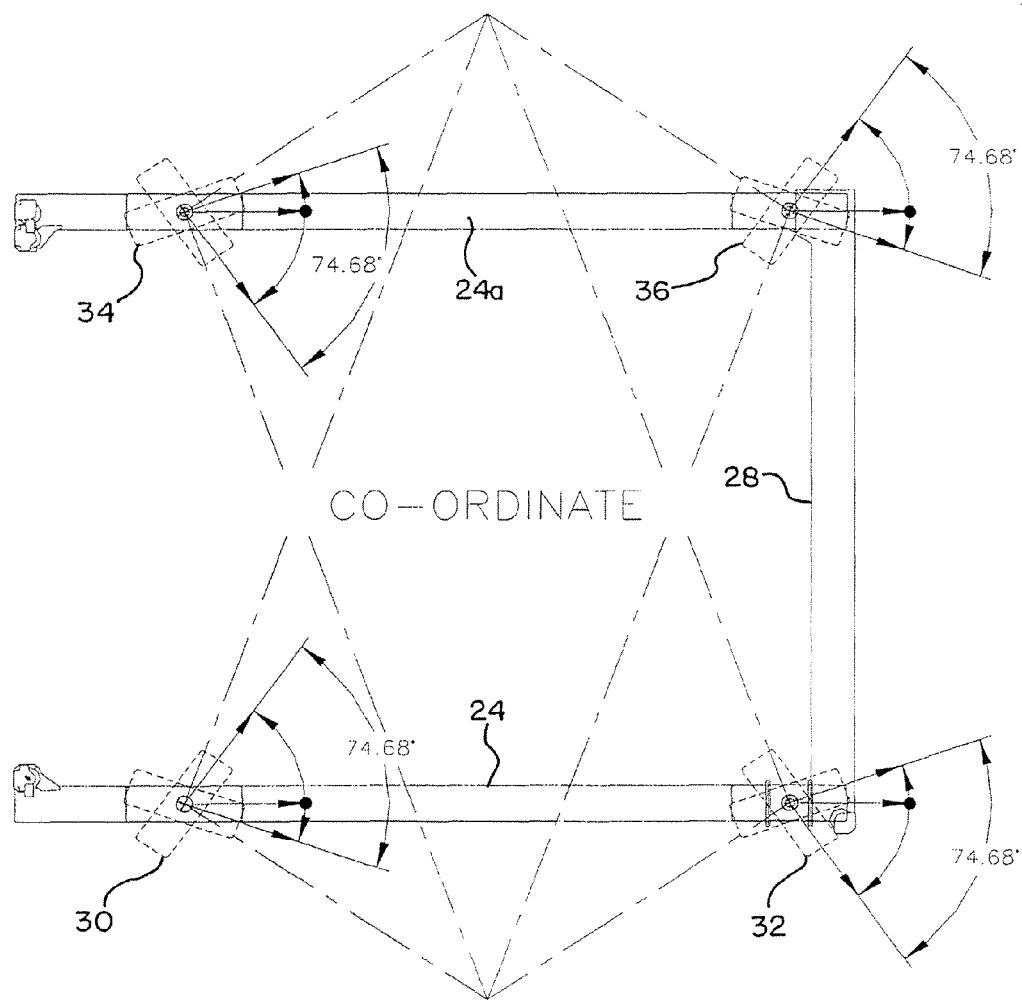
FIG. 7 is a top plan view of the gantry crane of FIG. 4 illustrating positioning of the wheels in a coordinated steering mode.

As shown in FIG. 3 and FIG. 6, the front wheels 32, 34 are rotated to effect steering of the gantry crane 12 in the two wheel front steering mode, while the rear wheels 30, 34 are kept in a fixed "straight ahead" position (to move the crane forward—i.e., in the direction of the cab 38 toward the cross-beam 28). Alternatively, these same wheels 32, 34 can be used to effect steering of the gantry crane backwards in the two wheel rear steering mode. Conversely, it is possible to rotate the rear wheels 30, 34 to effect the two wheel rear steering mode in the forward direction or the two wheel front steering mode in the rear position. In this embodiment, the front wheels 32, 34 will be fixed in the "straight ahead" position.

In the four wheel coordinated steering mode, the controller 110 can rotate (i.e., turn) each of the wheels 30, 32, 34, 36 to steer the gantry crane 12. This can be useful, for example, to provide a tighter turning radius for the crane 12.

The steering system 10 includes various safety features. One safety feature is invoked when a new steering mode is selected by the operator. In this instance, the prior mode running at the time of the new selection will not change until the control system determines it is safe to change steering modes. This helps prevent damage to the crane or items attached to or carried by the crane, or an inadvertent change to the steering mode. Determining whether it is safe to change modes can depend on a number of different factors, such as the present speed or direction of the crane, as well as the current position of the wheels. For example, when changing to certain modes, the control system will not allow the new steering mode to actually change until the wheels all cross a point near the straight ahead direction. Similarly, the control system will not allow a change to certain steering modes unless the crane is stopped. Specifically, in the case of changing to the carousel steering mode, the control system will not allow the new steering mode until the crane is stopped.

In another safety feature, if the controller 110 senses that one (or more) of the wheel(s) 30, 32, 34, 36 cannot reach its desired (i.e., commanded) position for any reason (for example, the wheel is moving slowly or stuck in a rut), the control system will limit the movement of the other wheels to limit the error between the desired wheel positions and the actual wheel positions of all the wheels 30, 32, 34, 36. This is to limit the amount of stress on the frame of the gantry crane 12 if one or more of the wheels does not go to its desired position. If the stuck wheel(s) becomes free to move (for example, the crane 12 is moved out of the rut), it will then seek its desired position. The maximum error allowed between the desired position of the wheels and the actual position of the stuck wheel(s) can by adjusted by the operator and/or implemented in the steering program. For example, if the difference between the actual position and the programmed position exceeds a threshold (e.g., three degrees) for any wheel, the controller 110 stops turning the other wheels to their programmed position until the situation is corrected (e.g., by another steering command or removal of an obstacle, such as by requiring the operator to drive the crane 12 forwards or backwards until the wheel is clear). In this manner, the wheel that moved the least (i.e., the stuck wheel) will determine the desired position of the other steering wheels.

The control system will retain the current steering mode setting when the power is turned off and will not change the steering mode when power is restored unless the proper conditions are met to allow change to a newly selected mode.

To implement steering the gantry crane 12, as well as certain of the safety features, the controller 110 is connected or networked to other systems or components in the gantry crane 12. The control system can then monitor and/or control various parameters of the gantry crane 12 relevant to the steering modes. These may include engine speed, engine load, machine speed, oil pressure, coolant temperature, fuel level, hydrostatic transmission pressure, wheel position, etc. The control system 10 automatically adjusts such parameters as necessary to implement the current steering mode or a newly selected steering mode. Additionally, the control system 10 also provides an alert or otherwise warns of problems with the engine or other devices being monitored. The preferred IQAN system can communicate with any other device that utilizes SAE J1939 or CAN Open communication protocols, over a network connection.

Similarly, the control system utilizes the sensed parameters to provide diagnostic capabilities that allow the operator to monitor machine operation or troubleshoot problems. The control system can measure and display values for inputs, outputs, calculated values, electronic engine parameters, hydraulic valve control parameters, or other parameters relevant to the operation of the crane 12.

One problem with existing systems is that the hydraulic motors that turn the wheels may not be able to keep up with the requests of the control system in low engine RPM situations. The gantry crane 12 has different engine modes of operation wherein the engine may be operating at a low RPM or higher RPMs. The engine RPMs affect how much hydraulic fluid may be delivered to the hydraulic motors 102. As a result, in a low engine RPM mode, one or more of the wheels might not be in the correct position for the steering mode selected. To overcome this result, the controller 110 receives input 148 (see FIG. 10) to monitor the current engine RPMs. When the RPMs are high enough to execute the current or selected steering mode, the steering system acts normally. However, if the RPMs are too low to execute the current or selected mode, a slower command is executed. This turns the relevant wheels at a slower rate.

As discussed above, another problem with existing gantry cranes occurs when the crane is switched into the carousel mode. In the past, this required positional rotation of two of the wheels approximately 90 degrees or more further than the other two wheels, in order for all four wheels to be in the proper position (to get all wheels driving—i.e., rotating along the axle of the wheel—in the proper direction). For example, if each of the wheels is set to drive forward in a "straight ahead" mode, then when switching to a "carousel" mode the right front wheel 32 can be rotated inwardly (counterclockwise) about 44 degrees and the right rear wheel 30 can be rotated outward (clockwise) −44 degrees to be in the proper position for the carousel mode; however, because the wheels are set to drive in a forward direction, the left front wheel 36 would need to be rotated about 134 degrees (counterclockwise) and the left rear wheel 34 would need to be rotated about −134 (clockwise, or 224 counterclockwise) to position each of the wheels at the appropriate angle with respect to the forward direction to implement the carousel mode in a counterclockwise direction about the center point 105. The steering system 10 of the present invention overcomes this problem by causing the driving direction of rotation of the two problem wheels (about each wheel's axle) to be reversed. This is accomplished by reversing the hydraulic motor associated with these wheels, either via a valve in the motor or by reversing the direction of the electrical current supplied to the motor. As a result, the problem wheels will only need to be rotated approximately 44 degrees (i.e., the left front wheel can be rotated −44 degrees inward (clockwise) and the rear left wheel 34 can be rotated 44 degrees outward (counterclockwise), similar to the other two wheels) to be in the proper position. The carousel mode reverse drive solenoid valve control 146, controlled by the controller 110 can be utilized for this feature.

The controller 110 can be configured to receive information relating to the wheel base and width of the gantry crane 12. Moreover, if the width is changed (e.g., for an embodiment having an adjustable cross-beam 28), the controller 110 can be programmed to automatically adjust the rotational position of the various wheels to take the dimensions of the crane into consideration. For example, the rotational position of the wheels in the carousel mode will depend on the width of the crane and can vary from the angles described above.

While the specific embodiments have been illustrated and described, numerous modifications come to mind without significantly departing from the spirit of the invention, and the scope of protection is only limited by the scope of the accompanying Claims.

What is claimed is:

1. A steering system for controlling the steering mode of a boat lifting apparatus comprising:
 a frame structure having a first front wheel proximate a front portion of a first side of the frame structure, a second front wheel proximate a front portion of a second side of the frame structure, a first rear wheel proximate a rear portion of the first side, and a second rear wheel proximate a rear portion on the second side, each wheel having an axle, wherein each wheel is configured to selectively turn about the respective axle in one of a first drive direction and a second, opposed drive direction to move the frame structure;
 a lifting assembly supported by the frame structure and adapted to engage and lift an object;
 a user interface for selecting a steering mode;
 a controller communicatively coupled to the user interface, the controller configured to control movement of the first and second front wheels and the first and second rear wheels in response to a selected steering mode, wherein in response to selection of a carousel steering mode, the controller is configured to cause the wheels to move to respective programmed angular positions for the carousel steering mode, and is further configured to cause the first front wheel and the first rear wheel to turn in the first drive direction and to cause the second front wheel and the second rear wheel to and turn in the second drive direction to cause the frame structure to turn in a carousel manner, and
 an engine connected to the frame structure, the engine capable of operation at a variety of different RPMs; and,
 a sensor coupled to the engine and the controller for providing the controller with an operating RPM of the engine, wherein if the operating RPM is lower than a predetermined amount, the controller adjusts the rate of change of the angular position of each wheel.

2. The steering system of claim 1, wherein each wheel has a motor connected thereto to provide power to the respective wheel, wherein in response to selection of a carousel steering mode, the controller is configured to reverse the motor for the second front wheel and the motor for the second rear wheel to cause the second front wheel and the second rear wheel to turn in the second drive direction.

3. The steering system of claim 1, wherein the controller is configured to move the first front wheel and the second rear wheel counterclockwise and to move the second front wheel and the first rear wheel clockwise to move each wheel to the respective programmed angular positions for the carousel steering mode.

4. The steering system of claim 1, further comprising:
 a first sensor for monitoring the angular position of the first front wheel;
 a second sensor for monitoring the angular position of the second front wheel;
 a third sensor for monitoring the angular position of the first rear wheel; and,
 a fourth sensor for monitoring the angular position of the second rear wheel;
 the first, second, third and fourth sensors coupled to the controller wherein the controller monitors the angular positions of the wheels and when one of the wheels exceeds a predetermined distance between a sensed position and a programmed position for the wheel, the controller stops angular movement of the remaining wheels.

5. The steering system of claim 1, wherein the controller is programmed to slow down movement of the frame structure before effecting the carousel steering mode.

6. A steering system for controlling the steering mode of a lifting apparatus comprising:
 a frame structure having a plurality of wheels;
 a user interface for selecting a steering mode;
 a controller communicatively coupled to the user interface, the controller configured to monitor the position of the plurality of wheels, and to control movement of the plurality of wheels; and,
 a sensor coupled to the controller and an engine connected to the frame for sensing RPMs of the engine, wherein the controller is configured to adjust a rate of movement of each of the wheels based on the sensed engine RPMs.

7. The steering system of claim 6 further comprising a lifting assembly supported by the frame structure and adapted to engage and lift an object.

8. The steering system of claim 6 wherein the user interface is configured to select at least one of a four-wheel steering mode and a carousel steering mode.

9. The steering system of claim 8 wherein in response to selecting the carousel steering mode, the controller is programmed to bring the frame structure to a stop before effecting the carousel steering mode.

10. The steering system of claim 6 wherein the system has a current steering mode wherein in response to selecting a different steering mode, the controller first determines that it is safe to change from the current steering mode to the different steering mode prior to effecting the change in steering modes.

11. The steering system of claim 6 wherein at least one of the first front wheel, the second front wheel, the first rear wheel and the second rear wheel is capable of turning 360 degrees to steer the apparatus.

12. The steering system of claim 6 wherein at least one of the first front wheel, the second front wheel, the first rear wheel and the second rear wheel has a gear drive mechanism operably connected thereto for turning the respective wheel to steer the apparatus.

13. The steering system of claim 6 wherein the engine operates in a high RPM mode and a low RPM mode wherein when the controller determines from the sensor that the engine is operating in the low RPM mode, the controller moves the wheels at a slower rate.

14. The steering system of claim 6, further comprising:
 a first sensor for monitoring the angular position of the first front wheel;
 a second sensor for monitoring the angular position of the second front wheel;
 a third sensor for monitoring the angular position of the first rear wheel; and,
 a fourth sensor for monitoring the angular position of the second rear wheel; the first, second, third and fourth sensors coupled to the controller wherein the controller monitors the angular positions of the wheels and when one of the wheels exceeds a predetermined distance between a sensed position and a programmed position for the wheel, the controller stops angular movement of the remaining wheels.

15. A steering system for controlling the steering mode of a lifting apparatus comprising:
   a frame structure having a plurality of wheels;
   a user interface for selecting a steering mode; and,
   a controller communicatively coupled to the user interface, the controller configured to monitor the position of the plurality of wheels, and to control movement of the plurality of wheels in response to a selected steering mode, wherein the controller is further configured such that when at least one wheel has a sensed position a predetermined distance from a programmed position the controller stops movement of the remaining wheels.

16. The steering system of claim 15 further comprising a lifting assembly supported by the frame structure and adapted to engage and lift an object.

17. The steering system of claim 15 wherein the user interface is configured to select at least one of a four-wheel steering mode and a carousel steering mode.

18. The steering system of claim 17 wherein in response to selecting the carousel steering mode, the controller is programmed to bring the frame structure to a stop before effecting the carousel steering mode.

19. The steering system of claim 15 wherein the system has a current steering mode wherein in response to selecting a different steering mode, the controller first determines that it is safe to change from the current steering mode to the different steering mode prior to effecting the change in steering modes.

20. The steering system of claim 15 wherein at least one of the first front wheel, the second front wheel, the first rear wheel and the second rear wheel is capable of turning 360 degrees to steer the apparatus.

21. The steering system of claim 15 wherein at least one of the first front wheel, the second front wheel, the first rear wheel and the second rear wheel has a gear drive mechanism operably connected thereto for turning the respective wheel to steer the apparatus.

22. The steering system of claim 15 wherein the once the wheel having the sensed position that is a predetermined distance from its programmed position is moved to the programmed position, the controller moves the remaining wheels to their respective programmed position.

23. The steering system of claim 15 wherein the predetermined distance defines a threshold wherein the threshold is adjustable.

24. The steering system of claim 23 wherein the threshold is three degrees.

25. The steering system of claim 15 further comprising:
   an engine connected to the frame structure, the engine capable of operation at a variety of different RPMs; and,
   a sensor coupled to the engine and the controller for providing the controller with an operating RPM of the engine, wherein if the operating RPM is lower than a predetermined amount, the controller adjusts the rate of change of the angular position of each wheel.

26. A steering system for controlling the steering mode of a lifting apparatus comprising:
   a frame structure having a plurality of wheels;
   a user interface for selecting a steering mode;
   a controller communicatively coupled to the user interface, the controller configured to monitor the position of the plurality of wheels, and to control movement of the plurality of wheels; and,
   a sensor coupled to the controller and an engine connected to the frame for sensing RPMs of the engine, wherein the engine operates in a high RPM mode and a low RPM mode wherein when the controller determines from the sensor that the engine is operating in the low RPM mode, the controller moves the wheels at a slower rate.

27. A steering system for controlling the steering mode of a boat lifting apparatus comprising:
   a frame structure having a first front wheel proximate a front portion of a first side of the frame structure, a second front wheel proximate a front portion of a second side of the frame structure, a first rear wheel proximate a rear portion of the first side, and a second rear wheel proximate a rear portion on the second side, each wheel having an axle, wherein each wheel is configured to selectively turn about the respective axle in one of a first drive direction and a second, opposed drive direction to move the frame structure;
   a lifting assembly supported by the frame structure and adapted to engage and lift an object;
   a user interface for selecting a steering mode; and
   a controller communicatively coupled to the user interface, the controller configured to control movement of the first and second front wheels and the first and second rear wheels in response to a selected steering mode, wherein in response to selection of a carousel steering mode, the controller is configured to cause the wheels to move to respective programmed angular positions for the carousel steering mode, and is further configured to cause the first front wheel and the first rear wheel to turn in the first drive direction and to cause the second front wheel and the second rear wheel to and turn in the second drive direction to cause the frame structure to turn in a carousel manner, wherein the controller is programmed to slow down movement of the frame structure before effecting the carousel steering mode.

* * * * *